(12) United States Patent
Smith

(10) Patent No.: US 11,415,213 B1
(45) Date of Patent: Aug. 16, 2022

(54) APPARATUS AND METHOD FOR REPAIR OF SHIFT CABLE ENDS IN VARIOUS MOTOR VEHICLES

(71) Applicant: Loring Smith, Lakeland, FL (US)

(72) Inventor: Loring Smith, Lakeland, FL (US)

( * ) Notice: Subject to any disclaimer, the term of this patent is extended or adjusted under 35 U.S.C. 154(b) by 0 days.

(21) Appl. No.: 17/206,001

(22) Filed: Mar. 18, 2021

(51) Int. Cl.
F16H 59/02 (2006.01)
F16H 61/36 (2006.01)

(52) U.S. Cl.
CPC ............ *F16H 59/02* (2013.01); *F16H 61/36* (2013.01); *F16H 2059/0269* (2013.01)

(58) Field of Classification Search
CPC ... F16H 59/02; F16H 61/36; F16H 2059/0269
See application file for complete search history.

(56) References Cited

U.S. PATENT DOCUMENTS

| | | | | |
|---|---|---|---|---|
| 2,905,492 A * | 9/1959 | Alexander | .......... | F16C 11/0609 403/130 |
| 4,662,772 A * | 5/1987 | Schultz | ............... | F16C 11/0609 403/114 |
| 5,419,214 A * | 5/1995 | Buhl | ....................... | F16C 1/106 74/543 |
| 5,735,177 A * | 4/1998 | Crack | ................... | F16H 59/042 74/473.3 |
| 7,144,182 B1 * | 12/2006 | Jordan | ................ | F16C 11/0633 403/126 |
| 7,845,252 B2 * | 12/2010 | Vermeersch | ............ | F16H 61/26 74/473.27 |
| 2008/0098841 A1 * | 5/2008 | Vermeersch | ............ | F16H 61/26 74/473.1 |
| 2012/0091292 A1 * | 4/2012 | Hahn | ...................... | F16H 61/36 248/65 |
| 2015/0040710 A1 * | 2/2015 | Wagner | ................. | F16H 59/105 74/473.3 |
| 2015/0330499 A1 * | 11/2015 | Smith | ..................... | F16H 61/36 29/898.07 |
| 2017/0058938 A1 * | 3/2017 | Naphade | ................. | F16H 61/36 |
| 2018/0363767 A1 * | 12/2018 | Kim | ....................... | G01D 5/145 |
| 2019/0316676 A1 * | 10/2019 | Jeong | ..................... | F16H 59/10 |
| 2020/0309252 A1 * | 10/2020 | Jiran | .................. | F16H 59/0204 |

* cited by examiner

*Primary Examiner* — David M Fenstermacher
(74) *Attorney, Agent, or Firm* — Todd Jennings

(57) ABSTRACT

Apparatus and method for promptly repairing the shift cable end in various motor vehicles. The prompt repair of the shift cable end in various motor vehicles without the replacement of the entire shift cable apparatus is accomplished using a specialized hushing made to fit securely within the shift cable and engage the shift lever, thus operably coupling the shift lever and shift cable end. In particular embodiments, a drilling tool is used to enlarge the coupling aperture within the shift cable end and a specialized bushing is inserted into the shift cable end. The bushing has a coupling means to simulate the factory installed coupling mechanism and an alignment and securing means for maintain the bushing's alignment and securing it within the shift cable end. The shift lever is then inserted into the bushing.

9 Claims, 6 Drawing Sheets

APPARATUS AND METHOD FOR REPAIR OF SHIFT CABLE ENDS IN VARIOUS MOTOR VEHICLES

CROSS-REFERENCES TO RELATED APPLICATIONS

Not Applicable

STATEMENT REGARDING FEDERALLY SPONSORED RESEARCH

Not Applicable.

NAMES OF PARTIES TO JOINT RESEARCH AGREEMENT

Not Applicable

REFERENCE TO A SEQUENCE LISTING

Not Applicable.

BACKGROUND OF THE INVENTION

Field of Invention

The present invention relates to an apparatus and method for repairing the transmission shift control linkage of various motor vehicles. The transmission shift control linkage of many motor vehicles generally consists of a shift cable that connects the gear selector or shift lever to the motor vehicle's transmission. The shift cable end is coupled with the gear selector or shift lever via a coupling mechanism that allows for the smooth operation of the shift linkage. In many motor vehicles, the factory-installed shift cable ends are pre-fitted with a factory-made coupling mechanism consisting of metal or plastic clips or similar appurtenances that engage the coupling member of a shift lever and allow for the coupling of a shift lever to the shift cable end. These factory-made coupling mechanisms, which are made a part of the shift cable ends, degrade or become damaged over time, allowing the shift cable end to become decoupled from the gear selector or shift lever, making it impossible for the operator of the automobile to engage the shift and the transmission. Presently, the failure of a transmission shift cable end coupling mechanism in various motor vehicles requires the removal and replacement of the entire shift cable. This is because the factory-made coupling mechanisms that are incorporated into the shift cable ends are not capable of being replaced or repaired. The replacement of the shift cable to achieve the repair of the shift cable end coupling mechanism can prove unnecessarily costly and time consuming.

Background Art

There are a large number of bushings in wide use in many fields. However, there are not many bushings in the art related to the specific use in transmission shift cable assemblies. The present inventor has previously disclosed in U.S. Pat. No. 10,619,723 and U.S. Pat No. 10,215,273 apparatuses and methods for repairing the couplings between multiple shift cable ends and shift levers in various motor vehicles. However, the shift cable ends and specialized bushings disclosed in these prior patents were materially different from the apparatus and method disclosed in the instant invention.

There are various apparatuses and methods for coupling a spherical or similarly-shaped coupling member within a bushing in other fields and devices. An example of such an apparatus is shown in U.S. Pat. No. 9,681,029, which discloses a bushing that engages a spherical component in a manner that enables the spherical component to be maintained in a static position. This is achieved through the frictional force between the outer surface of the spherical component and the inner surface of the bushing. However, this disclosure is not suited to a shift cable end repair because the mere frictional force between the spherical component of a shift lever and bushing would not maintain the shift lever in a static position. Thus, in lieu of a frictional force, the bushing disclosed in the instant invention carries two coupling members that engage and snap around the spherical component of the shift lever.

Another example is U.S. Pat. No. 9,872,710 which discloses a bushing with an expandable and compressible cavity for engaging with and fixing in position a curved coupling member. The bushing disclosed contains a spherical cavity with slots that allow the bushing to be expanded to allow for the insertion of the curved coupling member and then compressed to fix it in place within the bushing. While this bushing fulfills its particular purpose, it is not suited for the instant application because the bushing in the instant invention must be inserted into a fixed, rigid bore within the shift cable end that provides no clearance for the bushing to be expanded and compressed to fix into position the shift lever. U.S. Pat No. 8,277,489 also discloses a bushing that is expanded and compressed to lock a coupling member into place.

U.S. Pat. No. 8,398,682 discloses a bushing having two annual protrusions with a convex outer surface for fitting the bushing into a receiver. The annual protrusions in this disclosure should be differentiated from the outer cylindrical sleeve in the instant invention, which similarly allows for the bushing to fit into the shift cable end. Importantly, the outer cylindrical sleeve is not comprised of two, separate protrusions as disclosed in U.S. Pat. No. 8,398,682. Instead, it forms a single, outer cylindrical member, the trailing edge of which is flush and uniform with the trailing edge of the inner cylindrical surface of the bushing. Two annular notches are carved out of the outer cylindrical member to permit the bushing to fit into the shift cable end. This detail of the instant invention is intentional and provides added stability and strength to the bushing.

SUMMARY OF INVENTION

Accordingly, it is the object of the present invention to provide a specialized bushing and method of installation into the transmission shift cable end that provides for the proper coupling of the shift cable end and shift lever without the replacement of the entire shift cable. In accordance with the invention, the replacement of the factory-made shift cable end coupling mechanism is achieved by a method utilizing a specialized bushing that properly couples the shift lever to the shift cable end and avoids the time and costs associated with the replacement of the entire shift cable.

In particular embodiments of the invention, the object of the invention may be accomplished by expanding the coupling aperture in the shift cable end with the use of a drilling tool, inserting a specialized bushing into the coupling aperture, and inserting the shift lever into the bushing. Such a bushing may, for example, be comprised of a cylindrical member having a bore, a coupling means for engaging the shift lever within the bore, and an alignment and securing means for maintaining the bushing on its axis and seeming the bushing in place within the coupling aperture. A coupling means may be comprised of coupling members extending angularly into the bore from the cylindrical member to engage the shift lever. The securing and alignment means may be comprised of semi-cylindrical members protruding from the outer surface of the cylindrical member to create a frictional force that holds the bushing in place.

DESCRIPTION OF DRAWINGS

FIG, 1 is a perspective illustration showing the details of an exemplary shift cable end.

DETAILED DESCRIPTION

Certain factory-installed shift cable ends in various motor vehicles are pre-fitted with a factory-made coupling mechanism for coupling a shift lever to the shift cable end. These factory-made coupling mechanisms, which generally consist of plastic clips or similar appurtenances, degrade over time and their replacement requires the installation of a new shift cable to include a new shift cable end. The replacement of the entire shift cable as a means of repairing a degraded shift cable end coupling mechanism is the generally accepted method because there is no known method for repairing the shift cable end coupling mechanism that ensures the proper coupling of the shift lever and shift cable end. Thus, it remained for the present inventor to recognize that designing a bushing for coupling the shift lever with an existing shift cable end and a method for its installation into a transmission shift cable end would provide an alternative to replacing the entire shift cable end and result in lower supply and labor costs.

Figure 1:
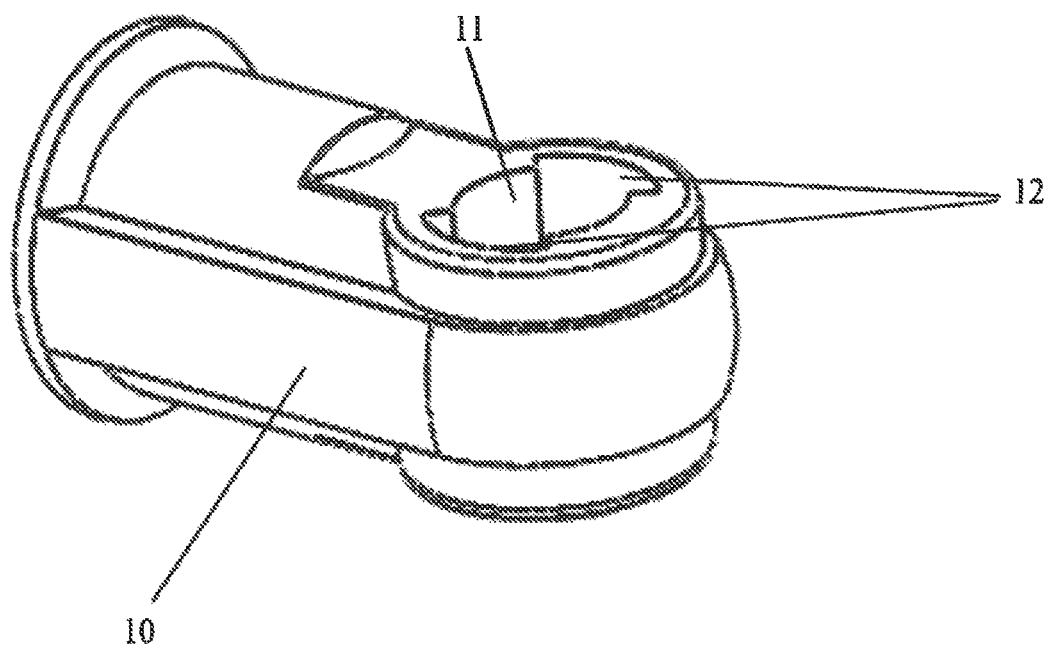
Figure 2:
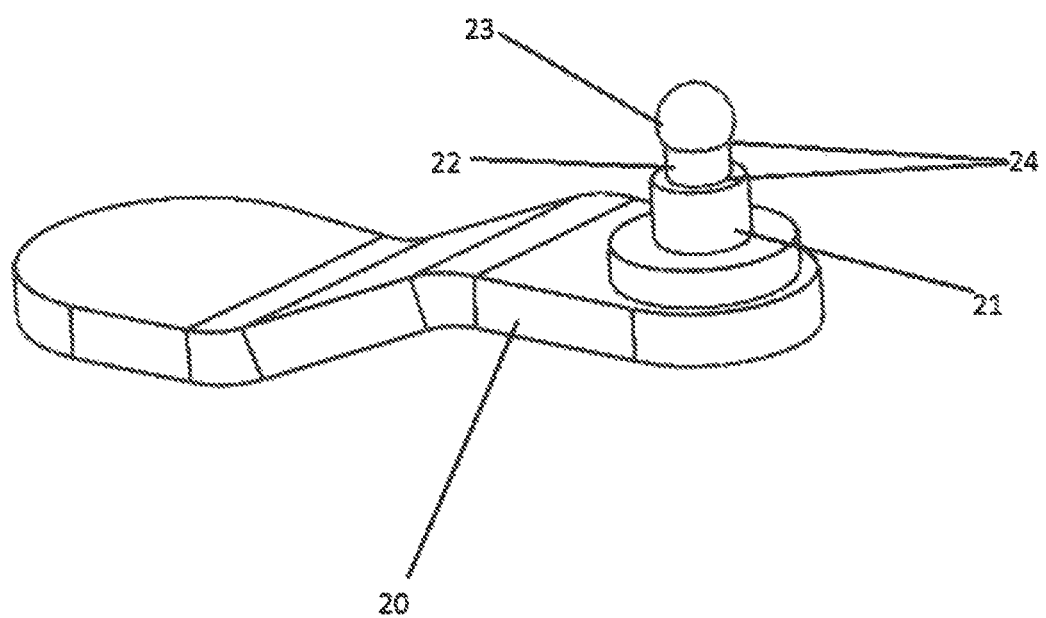
FIG. 2 is a perspective illustration showing the details of an exemplary shift lever.

Referring to FIG. 1 and FIG. 2, an exemplary transmission shift cable end 10 and shift lever 20 are illustrated. The shift cable end 10 operably couples the shift lever 20 with the shift cable (not shown) and allows the shift lever to engage the transmission (not shown). This particular example of a shift cable end 10 includes a coupling aperture 11 extending through the shift cable end 10. The coupling aperture in this particular example is a cylindrical bore 11. Two, diametrically opposed, semi-annular openings 12 having convex surfaces are located in the shift cable end 10 along the circumference of the coupling aperture 11 The semi-annular openings 12 are radially aligned with the coupling aperture 11.

Referring again to FIG. 2, an exemplary shift lever is illustrated. The shift lever 20 is inserted into the shift cable end 10 to operably couple with the shift cable (not shown). This particular example of a shift lever includes a first cylindrical member 21, a second cylindrical member 22 and a spherical member 23. The first cylindrical member 21 and spherical member 23 are of diameters approximately equivalent to the diameter of the coupling aperture 11. The second cylindrical member 22 is of a diameter less than the first cylindrical member 21 and spherical member 23 and thus forms a notch 24 between the first cylindrical member 21 and spherical member 23.

Figure 3A:
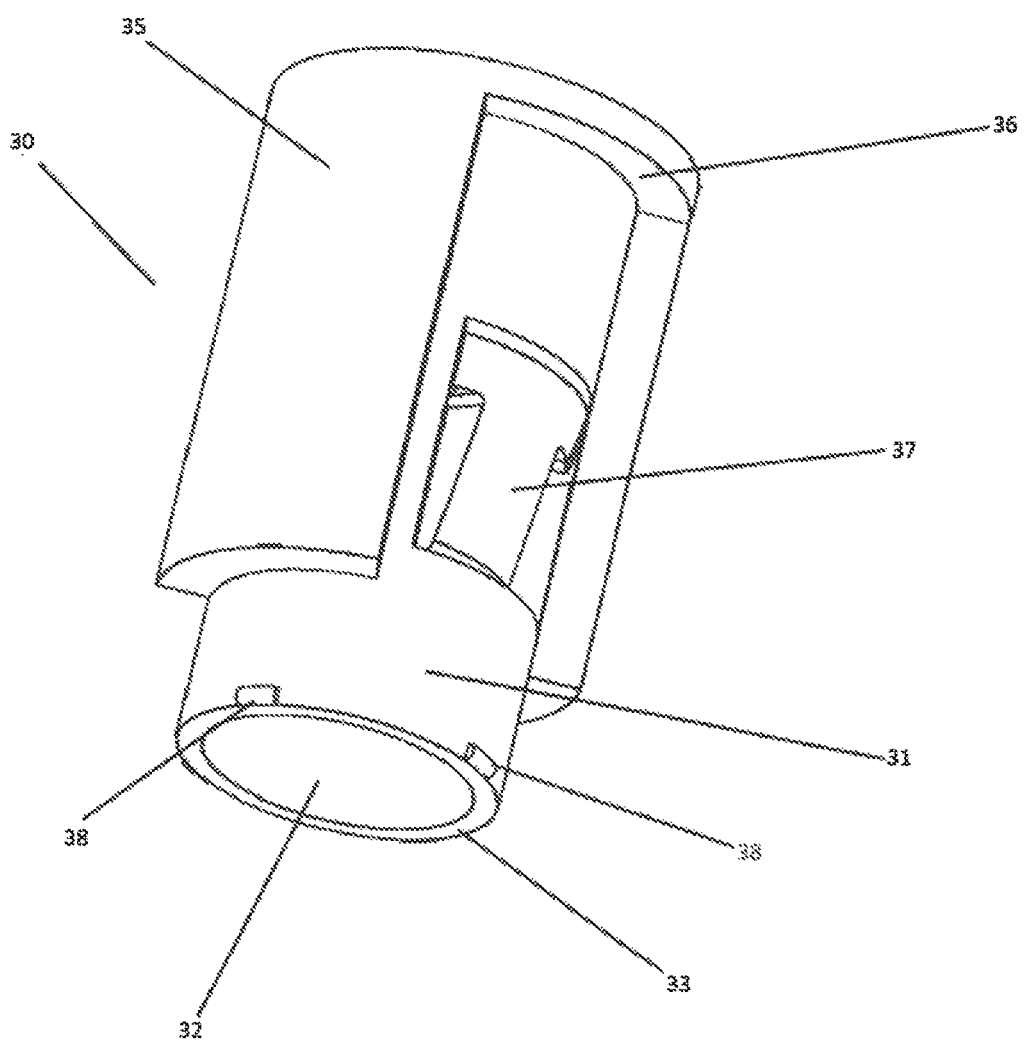
FIG. 3a is a perspective illustration of an exemplary bushing.
Figure 3B:
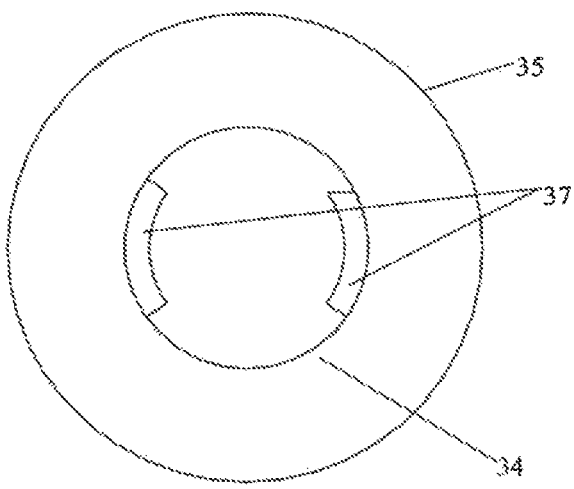
FIG. 3b is a top elevation illustration of an exemplary bushing.
Figure 3C:
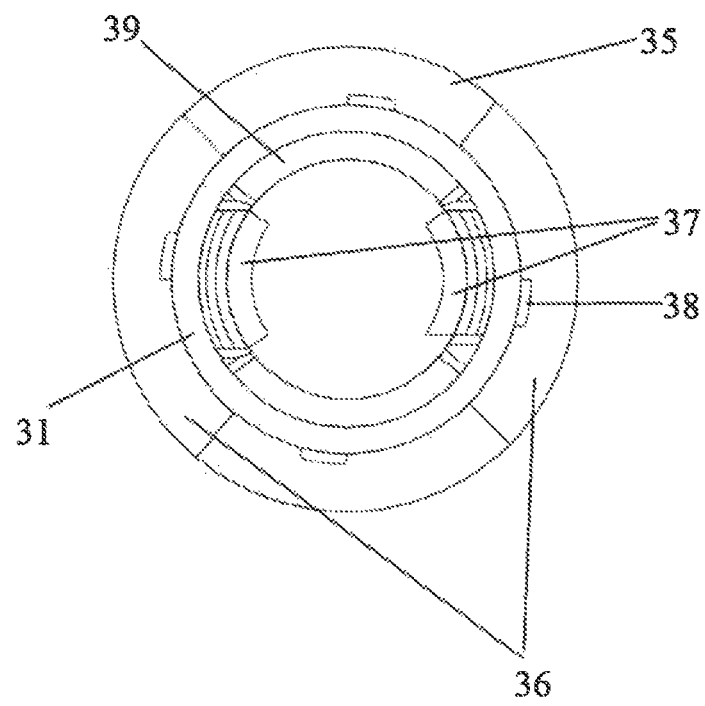
FIG. 3c is a bottom elevation illustration of an exemplary bushing.

In this example (FIG. 3a, FIG. 3b, and FIG. 3c), the bushing 30 is comprised of a cylindrical coupling member 31 of a diameter approximately equivalent to the diameter of the coupling aperture 11 of the shift cable end 10. The cylindrical coupling member 31 has a bore 32, a leading edge 33 and a trailing edge 34. The cylindrical coupling member 31 carries an outer cylindrical member 35 of a diameter approximately the equivalent of the diameter formed by the two semi-annular openings 12 in the shift cable end 10. The outer cylindrical member 35 is of a length shorter than the length of the cylindrical coupling member 31 and has two diametrical, semi-annular notches 36 that leave exposed the outer surface of the cylindrical coupling member 31. The purpose of the outer cylindrical member 35 and the semi-annular notches 36 are to allow the bushing 30 to engage the semi-annular openings 12 in the shift cable end 10. The outer cylindrical sleeve 35 also provides the bushing with additional strength and stability.

The cylindrical coupling member 31 also carries a coupling mechanism that ensures the coupling of the shift lever 20 and shift cable end 10 by engaging the notch 24 and securing the spherical member 23 of the shift lever 20 within the bushing 30. In this particular embodiment, the coupling mechanism is comprised of two, diametrically opposing, coupling members 37 that extend inward from the cylindrical coupling member 31. When the shift lever 20 is inserted into the bushing 30 during installation as described more fully below, the coupling arms 37 extend around the spherical member 23 of the shift lever 20 and engage the notch 24 formed between the first cylindrical member 21 and spherical member 23. This locks the spherical member 23 within the bushing 30 and prevents the shift lever 20 from being disconnected from the shift cable end 10. A coupling mechanism embodying the principles of the invention have any desired number of coupling members. For example, if the coupling mechanism is comprised of four coupling members, it is guaranteed to keep the spherical member 23 locked within the bushing 30. However, additional coupling members may reduce the strength and stability of the bushing. Additionally, a coupling mechanism may be comprised of coupling arms of various shapes and sizes.

The cylindrical coupling member 31 also carries an inner cylindrical member 39 that extends from the trailing edge 34 of the bushing 30 to the coupling members 37. The purpose of the inner cylindrical member 39 is to provide support for the coupling members 37 and additional strength and stability to the bushing 30.

The cylindrical coupling member 31 further carries an alignment and securing means that aligns and secures the bushing 30 within the coupling aperture 11. In this particular embodiment, the alignment and securing means is comprised of several protruding members spaced evenly around the outer radial surface of the cylindrical coupling member 31 adjacent to its leading edge 33. This particular embodiment includes four semi-cylindrical protrusions 38 spaced quarterly around the outer radial surface of the cylindrical coupling member 31. The semi-cylindrical protrusions 38 create friction between the bushing 30 and the coupling aperture 11 fa prevent the bushing 30 from dislodging and to keep the bushing 30 from twisting within the coupling aperture so that is remains aligned on its axis. An alignment and securing means embodying the principles of the invention have any desired number of protrusions. For example, if the alignment and securing means is comprised of six protrusions, it is guaranteed to keep the bushing 30 in place and aligned. Similarly, an alignment and securing means may be comprised of less than four protrusions; however, such a means may not achieve the desired level of stability and alignment. Additionally, an alignment and securing means may be comprised of protruding members of various shapes, and not just semi-cylinders.

The bushing 30 may be made of any polymer, copolymer or similar rigid material capable of being molded for the particular application and capable of withstanding the force applied on the bushing by the shift lever 20, particular the force applied by the spherical member 23 to the coupling arms 37. The bushing in the illustrative embodiment is made of polyoxymethylene.

Figure 4A:
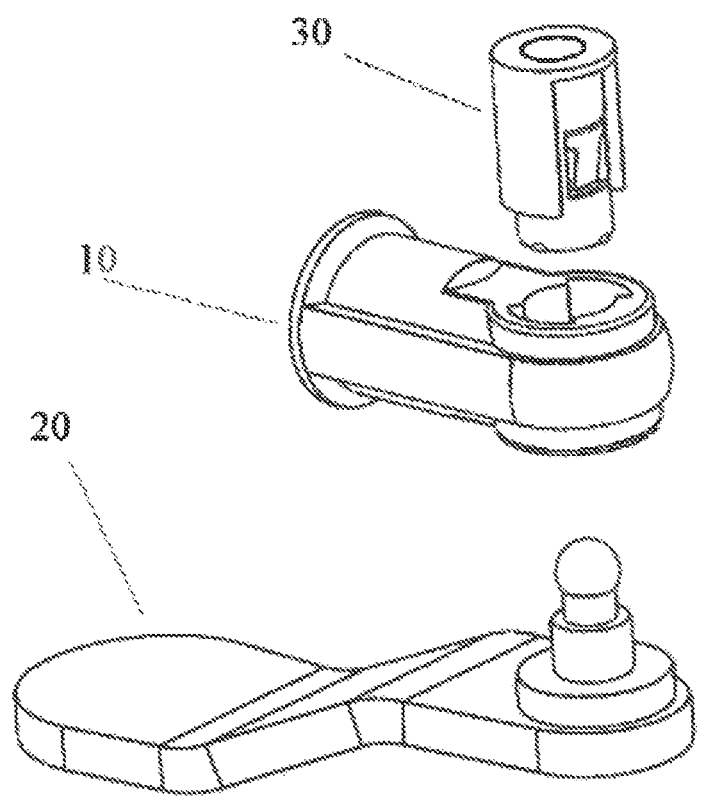
FIG. 4a is an exploded perspective illustration of an exemplary shift cable end, shift cable lever, and bushing.
Figure 4B:
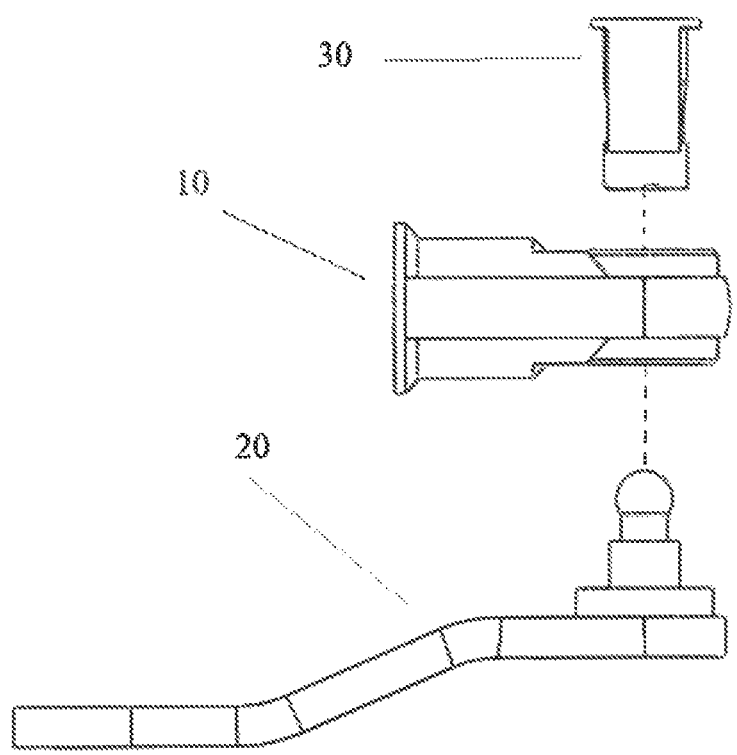
FIG. 4b is an exploded side elevation perspective of an exemplary shift cable end, shift lever, and bushing.

In accordance with the present invention, FIGS. 4*a* and FIG. 4*b* illustrate an example of a method to replace the degraded or damaged coupling mechanism utilizing the bushing 30 described above. A drilling tool 51 is used to enlarge the coupling aperture 11 to make sure these is enough clearance for the bushing 30. In this embodiment, the drilling tool 51 is a ⅜ inch drill bit. However, any size drill bit or drilling tool that achieves the objective of enlarging the coupling aperture 11 may be used. The drilling tool 51 is applied to the coupling aperture 11 until the coupling aperture is enlarged enough to accommodate the bushing 30. The bushing 30 is then inserted into the coupling aperture 11 by aligning the outer cylindrical sleeve 35 of the bushing 30 with the semi-annular openings 12 of the shift cable end. The alignment and securing means 38 will hold the bushing 30 in place once it is fully inserted into the coupling aperture 11. With the bushing 30 fully inserted into the coupling aperture 11, a compressive force, such as that applied by a thumb, is applied to the trailing edge 34 of the bushing 30 while the shift cable end 10 is simultaneously pushed onto and over the shift lever 20. The compressive force is applied until the bushing 30 is fitted over the shift lever 20 and the spherical member 23 of the shift lever 20 engages the coupling members 37 of the bushing 30. When the spherical member 23 and coupling members 37 are fully engaged, the shift cable end 10 and shift lever 20 will not slide.

The foregoing merely describes the present invention in an illustrative manner. The terminology employed is intended to be merely words of description, and not of limitation. It will thus be appreciated that that those skilled in the art will be able to make numerous modification and variations of the present invention in light of the above teachings. Such modifications and variations, while not illustrated or described herein, embody the principles of the present invention, and are within the spirit and scope of the appended claims.

The invention claimed is:

1. An apparatus for coupling a shift cable end and shift lever, said shift cable end comprising an elongated member having a coupling aperture extending through the elongated member and semi-annular openings bordering the coupling aperture, said shift lever comprising an elongated member having a first cylindrical member, a second cylindrical member, and a spherical member, comprising:
   a coupling member having a leading edge and a trailing edge;
   a bore running lengthwise through the coupling member;
   coupling protrusions extending angularly from the coupling member into the bore;
   alignment members extending out from the outer surface of the coupling member; and
   an outer annular member around the coupling member, said outer annular member having notches for alignment with the coupling aperture.

2. An apparatus for coupling a shift cable end and shift lever, said shift cable end comprising an elongated member having a coupling aperture extending through the elongated member and diametrically opposed semi-annular openings bordering and radially aligned with the coupling aperture, said shift lever comprising an elongated member having a first cylindrical. member, a second cylindrical member, and a spherical member, comprising:
   a cylindrical member having a leading edge and a trailing edge;
   a cylindrical bore running lengthwise through the cylindrical member;
   coupling members protruding angularly from the cylindrical member into the bore;
   alignment and securing members extending out from the outer surface of the cylindrical member adjacent to its leading edge;
   an inner cylindrical member running lengthwise inside the bore from the trailing edge of the cylindrical member to the coupling members; and
   an outer cylindrical member around the cylindrical member, said outer cylindrical member having two diametrically opposed, semi-annular notches for alignment with the coupling aperture and semi-annular openings in the shift cable end.

3. An apparatus as in claim 2 where the cylindrical member is of a diameter equivalent to the diameter of the coupling aperture.

4. An apparatus as in claim 2 wherein the cylindrical bore is of a diameter marginally greater than the diameter of the spherical member of the shift lever.

5. An apparatus as in claim 2 wherein the outer diameter of the outer cylindrical member is of a diameter marginally less than the diameter formed by the semi-annular openings in the shift cable end.

6. An apparatus as in claim 2 wherein the inner cylindrical member and outer cylindrical member are flush with the trailing edge of the cylindrical member and form a single, trailing surface.

7. An apparatus as in claim 2 wherein the coupling members are comprised of two quadrilateral members.

8. An apparatus as in claim 2 wherein the alignment members are comprised of four, semi-cylindrical members spaced evenly around outer surface of the cylindrical member.

9. A method for coupling a shift cable end and shift lever, said shift cable end comprising an elongated member having a coupling aperture extending through elongated member and diametrically opposed semi-annular openings bordering and radially aligned with the coupling aperture, said shift lever comprising an elongated member having a first cylindrical member, a second cylindrical member, and a spherical member, comprising:
   providing a bushing having a cylindrical member with a leading edge and a trailing edge, a cylindrical bore running lengthwise through the cylindrical member, coupling members extending angularly from the cylindrical member into the bore, alignment members extending out from the outer surface of the cylindrical member adjacent its leading edge, an inner cylindrical member running lengthwise inside the bore of the cylindrical member from the trailing edge of the cylindrical member to the coupling members, and an outer cylindrical member around the cylindrical member, said outer cylindrical member having two diametrically opposed, semi-annular notches for alignment of the outer cylindrical member with the semi-annular openings in the shift cable end;

enlarging the coupling aperture with a drilling tool until the coupling aperture is of a diameter marginally greater than the diameter of the cylindrical member of the bushing;

inserting the bushing into the coupling aperture by aligning the outer cylindrical member with the semi-annular openings bordering the coupling aperture;

simultaneously applying a sufficient compressive force to the trailing edge of the bushing and inserting the shift lever into the bore of the cylindrical member until the spherical member of the shift lever passes the coupling members of the hushing and the coupling members engage the second cylindrical member of the shift lever.

* * * * *